UNITED STATES PATENT OFFICE.

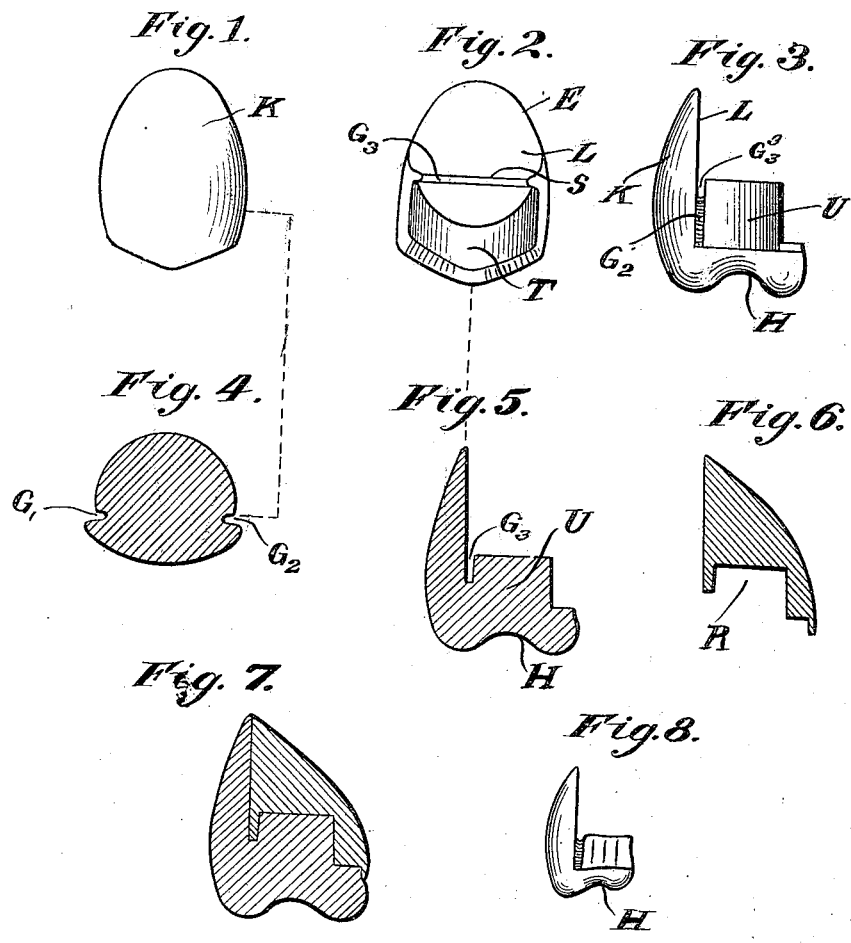

VINCENT MALLON, OF NEW YORK, N. Y., ASSIGNOR TO DENTAL MANIKIN HEAD CO. INC., A CORPORATION OF NEW YORK.

PORCELAIN TOOTH FOR CROWN, BRIDGE, AND PLATE WORK.

1,425,601.   Specification of Letters Patent.   Patented Aug. 15, 1922.

Application filed October 26, 1920. Serial No. 419,592.

*To all whom it may concern:*

Be it known that I, VINCENT MALLON, a citizen of the United States, and resident of New York, in the county and State of New York, have invented new and useful Improvements in Porcelain Teeth for Crown, Bridge, and Plate Work, of which the following is a clear and exact specification.

The teeth used heretofore in crown and bridge as well as in gold plate work had most generally either pins backed in the porcelain body or a central hole in the mass of porcelain. This latter although it makes a tight connection with a post weakens the porcelain in a place where the stress of mastication is highest and it happens very often that porcelain teeth of such construction break.

The object of my invention is the construction of a porcelain tooth with a solid mass of porcelain in the central portions provided with suitable grooving on peripheral surfaces for retention upon a metallic backing.

Figure 1 is the front view of a left upper bicuspid.

Figure 2 is the back view.

Figure 3 is a side view of the same.

Figure 4 is a horizontal cross section of the tooth shown in Figure 1.

Figure 5 is a vertical cross section in sagittal direction (sagittal is from lip to tongue) of the tooth shown in Figure 2.

Figure 6 is a vertical cross section in sagittal direction of a backing.

Figure 7 shows in cross section a porcelain tooth with a backing in contact.

Figure 8 is a side view of a molar tooth.

The improvement laid down in my present invention consists in a new way of making retention of a porcelain tooth upon a backing by the arrangement of certain grooves in the surfaces of the tooth. My improvement is best applied to the class of porcelain teeth which have the shape of pin teeth for vulcanite work. Taking the general shape of them and eliminating the presence of pins I have provided an upright or perpendicular groove, $G^1$ in the mesial surface and an upright or perpendicular groove $G^2$ in the distal surface (Fig. 4).

The ridge lap L, is the flat end of the tooth and is preferably made in upright, straight upright or perpendicular direction. At one end F, Figure 2 the ridgelap turns over in the facial surface of the tooth, at the other end, S, a third groove $G^3$ runs from the mesial to the distal surface through the porcelain body thus at the base of the tooth connecting the grooves G, and $G^2$ by the groove $G^3$.

The groove $G^3$ may be of a slot like shape and of any desired depth. The grooves $G^1$, $G^2$, and $G^3$ taken together form one U-like arranged groove extending over three surfaces of the tooth.

In the preferred constructions shown in Figures 3 and 8 the U-like groove encircles the tooth; it commences near the biting edge of the mesial surface, runs in upright direction across the mesial surface, extends from there at the base of the tooth through the porcelain body in mesio-distal direction continues from there in upright direction across the distal surface and terminates near the biting edge of the distal surface. The tooth is made throughout of solid dental porcelain, has no weakening holes and no pins. The entire retention is effected by an encircling surface grooving.

A backing of metal adapted to fit the back surface of the tooth embraces the solid porcelain body of the back part U (Figures 3 and 8), it engages the encircling groove in the sections $G^1$, $G^2$ and $G^3$ thus making a firm connection when the tooth is cemented. The strength of the solid porcelain tooth, the inexpensive manufacture and the ease of manipulating a porcelain tooth provided with a U-like arranged encircling groove are of great advantage in the construction of crown, bridge and plate work.

Having now fully described my invention I claim:

In a porcelain tooth for crown, bridge and plate work having a solid surface construction an encircling groove commencing near the biting edge of the mesial surface, running in upward direction across the mesial surface, extending in mesio-distal direction through the porcelain at the base of the tooth and again in upward direction across the distal surface, terminating near the biting edge of the distal surface.

VINCENT MALLON.

Witnesses:
  SIMON YOHALEM,
  J. R. BURKE.